United States Patent [19]
Albrecht

[11] Patent Number: 5,210,565
[45] Date of Patent: May 11, 1993

[54] OSCILLATING PUPIL AUTOFOCUS METHOD AND APPARATUS

[75] Inventor: Richard E. Albrecht, Honeyoye Falls, N.Y.

[73] Assignee: Eastman Kodak Company, Rochester, N.Y.

[21] Appl. No.: 719,280

[22] Filed: Jun. 21, 1991

[51] Int. Cl.⁵ ............................................. G03B 13/18
[52] U.S. Cl. ...................................................... 354/402
[58] Field of Search ................ 354/402, 404, 403, 405

[56] References Cited

U.S. PATENT DOCUMENTS

| | | | |
|---|---|---|---|
| 2,999,436 | 9/1961 | Faulhaber | 95/10 |
| 3,450,883 | 2/1965 | Thomas | 250/204 |
| 3,833,806 | 9/1974 | Sato | 250/201 |
| 3,906,219 | 9/1975 | Stauffer | 250/204 |
| 3,941,996 | 3/1976 | Stauffer | 250/201 |
| 4,201,456 | 5/1980 | Wolbarsht | 353/101 |
| 4,209,241 | 6/1980 | Nanba et al. | 354/25 |
| 4,484,806 | 11/1984 | Onishi et al. | 354/404 |
| 4,543,476 | 9/1985 | Horikawa | 250/201 |
| 4,631,394 | 12/1986 | Horikawa | 250/201 |
| 4,740,678 | 4/1988 | Horikawa | 250/201 |
| 4,782,356 | 11/1988 | Sano et al. | 354/403 |
| 4,833,315 | 5/1989 | Horikawa | 250/201 |
| 4,842,387 | 6/1989 | Murakami et al. | 350/429 |
| 4,855,777 | 8/1989 | Suda et al. | 354/402 |

Primary Examiner—Michael L. Gellner
Assistant Examiner—Jae N. Noh
Attorney, Agent, or Firm—David Hall

[57] ABSTRACT

A camera having a sensor array, a lens, and shutter blades, for focusing the lens in preparation for exposing a frame of photographic film, comprises a means for oscillating the shutter blades, separately, between open and closed positions to expose said sensor array with image light passing through corresponding pupils of the lens. A control means, responsive to said oscillating means, controls the sensor array to sample image light received through the corresponding pupils. A comparing means compares the sensed image light of the pupils with each other and produces a focus adjustment signal representative of a direction of focus error. Lastly, a focusing means, responsive to said focus adjustment signal, focuses said lens according to the focus error.

27 Claims, 5 Drawing Sheets

OSCILLATING PUPIL AUTOFOCUS METHOD AND APPARATUS

BACKGROUND OF THE INVENTION

1. Field of the Invention

The present invention relates to a camera and, more particularly, to a camera including an oscillating pupil autofocus device.

2. Description of the Related Art

Photographic film cameras are known which employ optical sensing devices for detecting and controlling focus. In general, these cameras include not only traditional optics and film handling mechanisms for the film, but also include additional optics and some type of solid state imager or photosensitive device to view an image of the scene. In the case of the solid state imager, an electronic image can be used to preview the scene for a variety of purposes, including focusing, before exposing the film.

In cameras employing solid state sensors, the same components of the optical system needed to produce an image of the scene are generally used to determine focus, exposure, and other data. However, for focus detection, the cameras employ a contrast method. With the contrast method, the contrast of an image of the scene when the lens aperture is wide open is compared to the contrast of the image when the lens aperture is stopped down. If there is a focus error, there is no indication of its direction. As a result, the lens must be moved in one of two directions and the error checked again to see if the focus improved. A disadvantage of not knowing the focus error direction frequently requires extra lens travel time. The use of extra lens travel time is undesirable in a camera application, since a subject may move during the extra lens travel time, resulting in a missed photographic opportunity.

Another type of known camera autofocus device employs an oscillating pupil technique. In general, some type of special mask is required to alternately obstruct different portions of an optical system to form images of the object. The presence of either a stationary or moving image is indicative of the focus condition of the optical system. A major disadvantage of such known oscillating pupil devices in cameras is the requirement of a special masking means and/or the requirement of additional focusing optics, in addition to the main camera optics.

For instance, in U.S. Pat. No. 4,201,456, issued May 6, 1980, a special mask is employed for alternately obstructing different portions of the camera optical system for detecting its focusing condition. A disadvantage of the '456 device is the requirement of the special mask in addition to the traditional camera optical components. Likewise, U.S. Pat. No. 3,833,806, issued Sep. 3, 1974, discloses an automatic focus control circuit which employs a special vibrating slit in addition to the traditional optical components of the camera.

Other known oscillating pupil focusing devices are disclosed in U.S. Pat. No. 4,543,476, issued Sep. 24, 1985; U.S. Pat. No. 4,631,394, issued Dec. 23, 1986; U.S. Pat. No. 4,740,678, issued Apr. 26, 1988; U.S. Pat. No. 4,833,315, issued May 23, 1989; U.S. Pat. No. 2,999,436, issued Sep. 12, 1961; U.S. Pat. No. 3,906,219, issued Sep. 16, 1975; and U.S. Pat. No. 3,941,996, issued Mar. 2, 1976. The major disadvantage of these devices is that each requires the use of a special mask and additional focusing optics. This adds cost, takes up additional space, and adds complexity to an overall camera device. These disadvantages are undesirable in low cost, compact, autofocus camera applications.

It would thus be desirable to provide oscillating pupil autofocus capability to a camera in which minimal additional components are required, compactness is maintained, and any added complexity to the overall camera design is minimized.

OBJECTS OF THE INVENTION

An object of the present invention is to provide a novel camera function which provides oscillating pupil autofocus without requiring an additional special mask.

It is a further object of the present invention to provide a method and apparatus for oscillating the shutter blades of a camera optical system for performing oscillating pupil autofocus.

It is a still further object of the invention to produce a focus adjustment signal indicative of a magnitude and a direction of focus error.

Another object of the present invention is to provide an inexpensive and uncomplicated camera which can perform oscillating pupil autofocus for focusing the camera lens.

SUMMARY OF THE INVENTION

In a preferred embodiment, a camera having a sensor array, a lens, and shutter blades, for focusing the lens in preparation for exposing a frame of photographic film, comprises a means for oscillating the shutter blades, separately, between open and closed positions to expose said sensor array with image light passing through corresponding pupils of the lens. A control means, responsive to said oscillating means, controls the sensor array to sample image light received through the corresponding pupils. A comparing means compares the sensed image light of the pupils with each other, wherein a positional shift in pupil images is indicative of a magnitude and direction of focus error. The comparing means further produces a focus adjustment signal representative of focus error. Lastly, a focusing means, responsive to said focus adjustment signal, focuses said lens according to the focus error.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

Because cameras and, more particularly, autofocus cameras are well known in the art, the present invention will be directed in particular to elements forming part of, or cooperating directly with, the invention. It is to be understood, however, that other elements not specifically shown or described may take various forms known to persons of ordinary skill in the camera art. In addition, while the invention is described with respect to a point-and-shoot viewfinder type camera, the invention is equally applicable to other types of cameras having film and a solid state imager or having totally electronic sensors.

Figure 1:
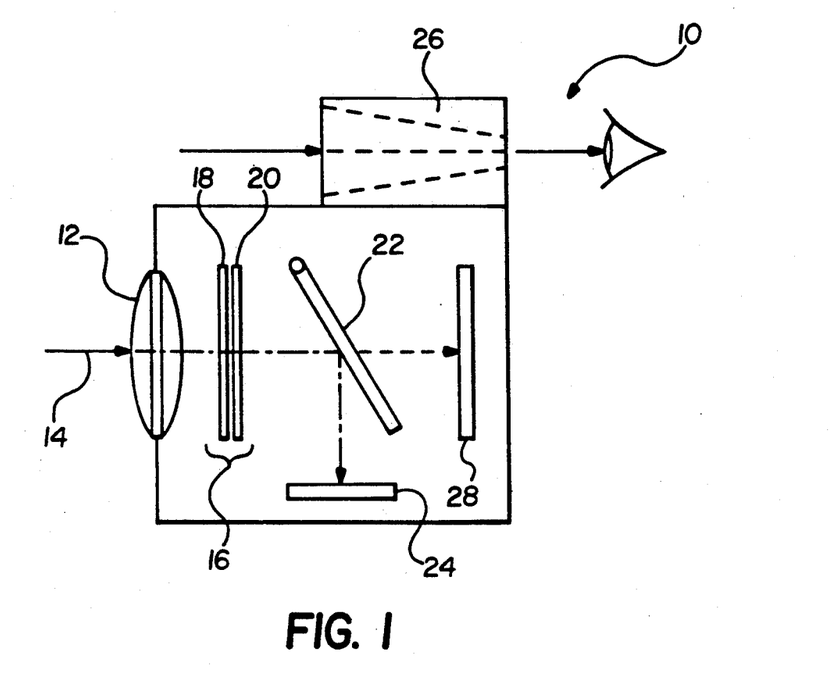
FIG. 1 is a schematic overall view of the camera in which the present invention may be placed.

Referring now to FIG. 1, a point-and-shoot type camera 10 is shown in which the present invention may be utilized. The camera 10 includes an optical element 12 which is disposed along an axis 14. Shutter mechanism 16 comprises first and second shutter blades, 18 and 20, respectively and is disposed along axis 14, also. When opened, shutter mechanism 16 allows incoming scene image light to be carried along axis 14 and reflected by mirror 22 onto solid state image sensor 24, located at an equivalent focal plane. Mirror 22 blocks light from film 28 when mirror 22 is in a downward vertical position. The image of the scene can also viewed through viewfinder 26. When a photographic shot is to be taken, the mirror 22 pivots upward to a horizontal position and shutter mechanism 16 is actuated, opening blades 18 and 20, so as to expose film 28.

The sensor can be a charge-coupled device (CCD) such as an interline CCD image sensor, number KAI-0280, manufactured by Eastman Kodak Company of Rochester, N.Y. This type of sensor uses photodiodes as the image sensing elements. However, other types of sensors could be used as well.

Figure 2:
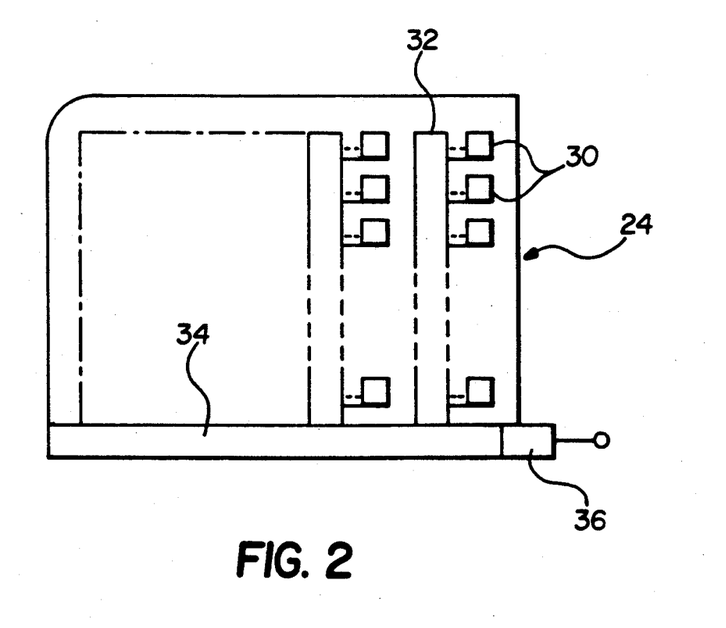
FIG. 2 is a schematic of the solid state image sensor used in the present invention.

FIG. 2 shows the arrangement of the photodiodes 30 in a matrix on the sensor 24. The photodiodes 30 are connected to a series of vertical shift registers 32. The charge collected on each photodiode is transferred to the corresponding shift register and then transported to a single horizontal shift register 34. An output section 36 converts the charge to a voltage signal. Clock signals are provided to shift the registers at appropriate times.

Since the present sensor may be utilized for a number of functions, it is preferable to include an entire matrix as shown in FIG. 2. However, for the function of the present invention, it is only necessary to utilize two photodiodes, a small group of photodiodes, or a single row of photodiodes. Thus, if other functions are not necessary, a much smaller sensor array can be utilized. Alternatively, if it is necessary to have the entire matrix due to other functions, it is possible to only sense the desired elements, such as a single row.

Figure 3A:
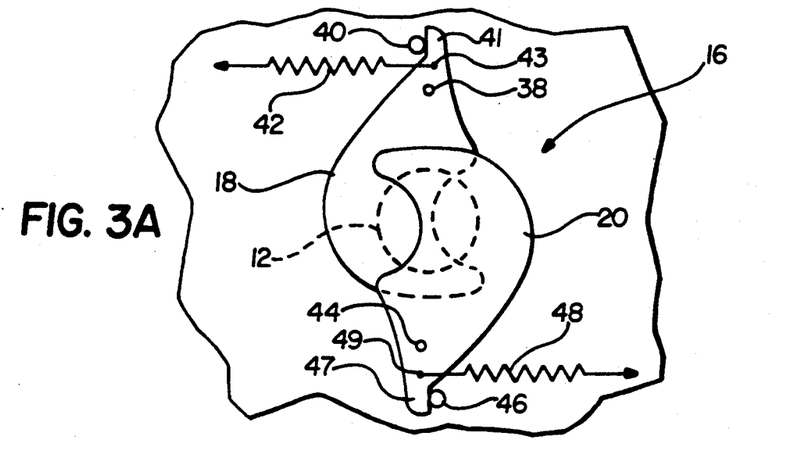
FIG. 3a, 3b, and 3c depict positions of first and second shutter blades for defining pupils used in conjunction with the present invention.

Referring now to FIG. 3a, the illustrated shutter mechanism 16 comprises first and second shutter blades, 18 an 20, respectively, disposed in front of optical element 12. First shutter blade 18 is pivotally mounted at first shutter blade pin 38. A first shutter driver pin 40 contacts shutter blade 18 at tab 41. When driven, pin 40 rotates blade 18 about Pin 38 in a clockwise direction. Spring 42 is attached to blade 18 at 43 and rotates blade 18 in a counterclockwise direction about pin 38, under a retention spring force. Similarly, second shutter blade 20 is pivotally mounted at second shutter blade pin 44. A second shutter driver pin 46 contacts shutter blade 20 at tab 47. When driven, pin 46 rotates blade 20 about pin 44 in a clockwise direction. Spring 48 is attached to blade 20 at 49 and rotates blade 20 in a counterclockwise direction about pin 44, under a retention spring force. Shutter mechanism 16 includes a number of other parts, which are not shown in the figures for the sake of clarity.

It should be noted that the invention is not limited to a two blade shutter mechanism, but is broadly applicable to multiple shutter blade mechanisms. Additionally, shutter mechanisms are well known in the camera art and take many forms. For example, shutter mechanism 16 could comprise an electromagnetic shutter device wherein the shutter blades open and close in response to control signals.

Figure 4:
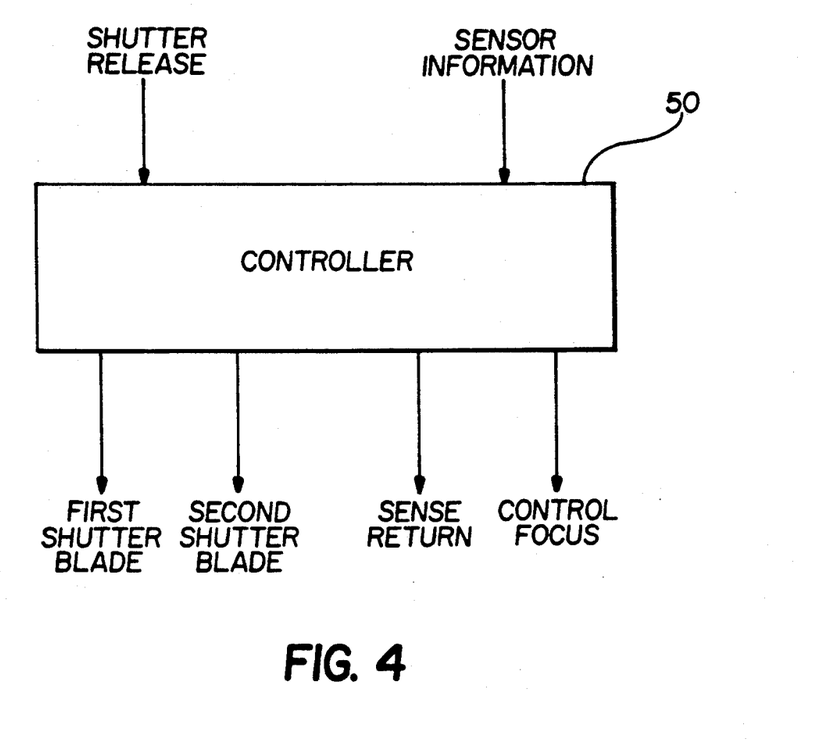
FIG. 4 is a schematic of the controller used in the present invention.

Turning now to FIG. 4, the particular functions which are based on the sensor array are controlled by a system controller 50. Controller 50 can comprise, for example, a microcomputer, a custom integrated circuit chip, or the like. Programming of a microcomputer and design and manufacturing of a custom integrated circuit chip are well known in the art; therefore, it is not discussed herein. Controller 50 operates in response to inputs from the camera such as the movement of the shutter release. Based on this and other inputs, the various functions to control the exposure and focus may be accomplished. Likewise, focus error can be determined by controller 50 based on the output of the sensor 24.

Figure 3B:
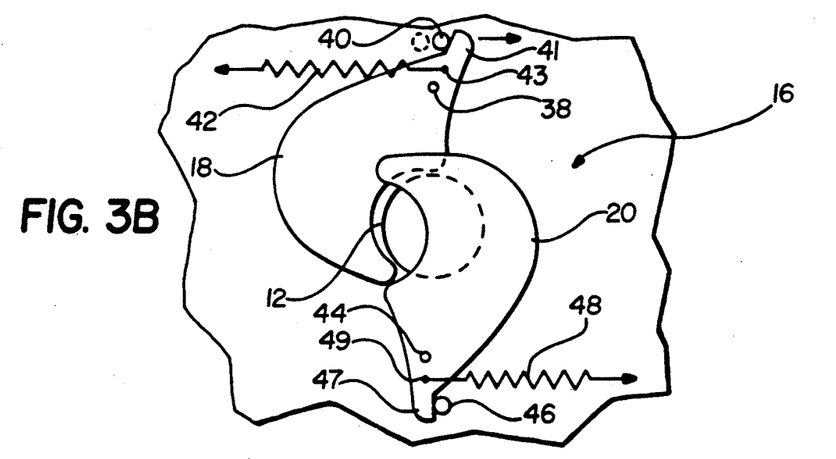
Figure 3C:
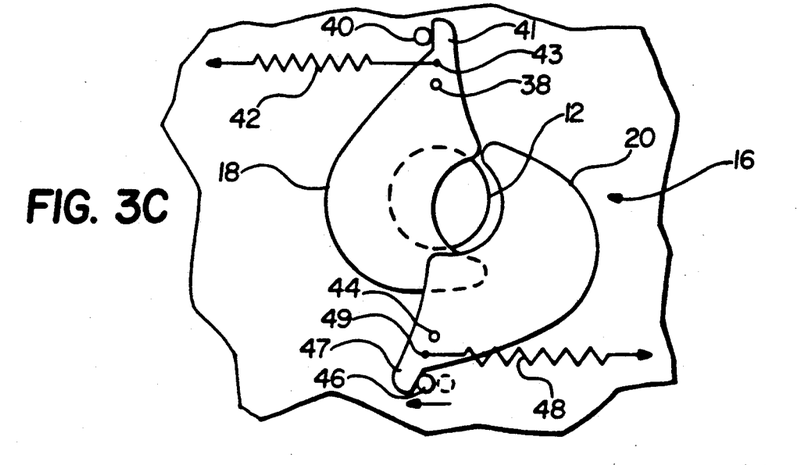

When the shutter release is actuated, the controller 50 senses the actuation and orders first shutter blade 18 to open and indicates to the sensor 24 that this has occurred. When first shutter blade 18 is opened, image light from objects in the scene passes through a first pupil of optical means 12 (FIG. 3b). The sensor samples this first pupil image light with the elements of the array. First shutter blade 18 then closes under the retention spring force of spring 42. Upon closure of shutter blade 18, controller 50 then orders second shutter blade 20 to open and indicates to the sensor 24 that this has occurred. When second shutter blade 20 is opened, image light from objects in the scene passes through a second pupil of optical means 12 (FIG. 3c). In the preferred embodiment, first and second pupils are substantially equal and symmetrically opposite pupils; however, other pupil arrangements are possible via the type of shutter mechanism used. The sensor 24 samples this second pupil image light with the elements of the array. Second shutter blade 18 then closes under the retention spring force of spring 48. Upon closure of shutter blade 20, controller 50 then compares the second pupil image signals with the first pupil image signals to determine the occurrence or non-occurrence of an image shift.

When performing image comparison, controller 50 looks for a shift in some feature in the first pupil image with respect to the second pupil image. A direction of image shift corresponds to a direction of focus error and is determined by detecting which direction the pupil images shifted. Similarly, a magnitude of image shift corresponds to a magnitude of focus error and is determined by detecting the distance between the images. For example, where a first pupil is on a left side of the optical axis and a second pupil is on an opposite, right side of the optical axis, image shift in a left to right direction on sensor 24 indicates an inside focus condition. When an inside focus condition is detected, the lens is required to be moved in an outward direction towards the scene to achieve a proper focus condition. Similarly, an image shift in a right to left direction on sensor 24 indicates an outside focus condition. When an outside focus condition is detected, the lens is required to be moved in an inward direction towards the camera film plane to achieve a proper focus condition.

In continuation of the above discussion, if the image comparison yields no image shift, indicative of an in-focus condition, the camera continues to operate in a standard fashion. However, if the comparison yields an image shift, indicative of an out-of-focus condition, the controller determines focus error via one of many methods for determining focus error well known in the camera autofocus art. That is, any known method for determining a magnitude and direction of focus error based on image shift may be used. Upon determining focus error, the controller generates a focus adjustment signal representative of a magnitude and direction of focus error. The controller then orders the lens to be moved responsive to the focus adjustment signal for focusing the lens according to the focus error.

Figure 5:
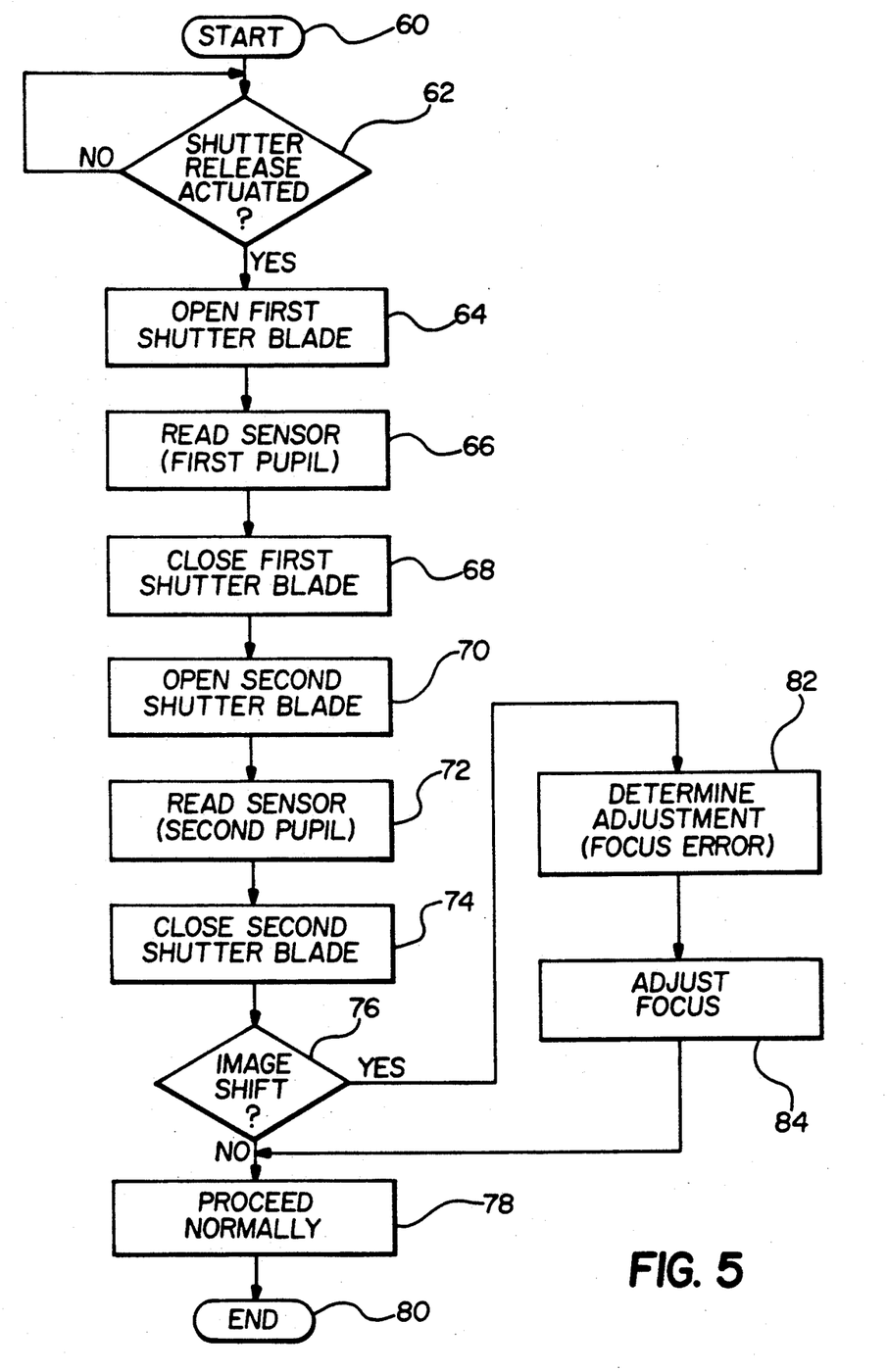
FIG. 5 is a flow chart indicating the sequence of the operation used in the preferred embodiment of the present invention.

This particular sequence of events is shown in FIG. 5 with the start procedure shown as 60. The determination as to whether the shutter release has been actuated is indicated as step 62. If the shutter release has not yet been actuated, the process returns to start and repeats until such a determination is made. When the shutter release has been actuated, an order is sent to the first shutter blade 18 to open (step 64). Next, an order is sent to sensor 24 for the appropriate elements to be read (step 66). In step 68, first shutter blade 18 is closed. Controller 50 then orders second shutter blade 20 to open (step 70). Next an order is sent to sensor 24 for the appropriate elements to be read (step 72). Second shutter blade 20 is then closed in step 74. In the instance where shutter blades 18 and 20 are actively driven closed by means other than a spring, controller 50 would order shutter blades 18 and 20 to close in steps 68 and 74, respectively. The first pupil image signals read in step 66 are compared in step 76 to the second pupil image signals read in step 72, indicating the occurrence or non-occurrence of an image shift. If the first and second pupil image signals are substantially equal, no image shift is detected. If no image shift is detected, then the process proceeds normally as indicated by step 78 until it reaches the end at step 80. If an image shift is detected, the controller determines focus error and generates a focus adjustment signal representative of a magnitude and direction of focus error (step 82). Controller 50 adjusts focus in step 84 in response to the focus adjustment signal. After the focus has been adjusted in step 84, the sequence proceeds normally at step 78 until it reaches the end step 80.

In an alternate embodiment of the present invention, the camera operates to perform real-time focus adjustment which is desirable in situations requiring the tracking of a moving object. That is, if an image shift is detected, the controller determines the direction of image shift and generates a focus adjustment signal representative of the direction of focus error. The lens is then focused in response to the focus error (i.e., moved in the determined direction).

Figure 6:
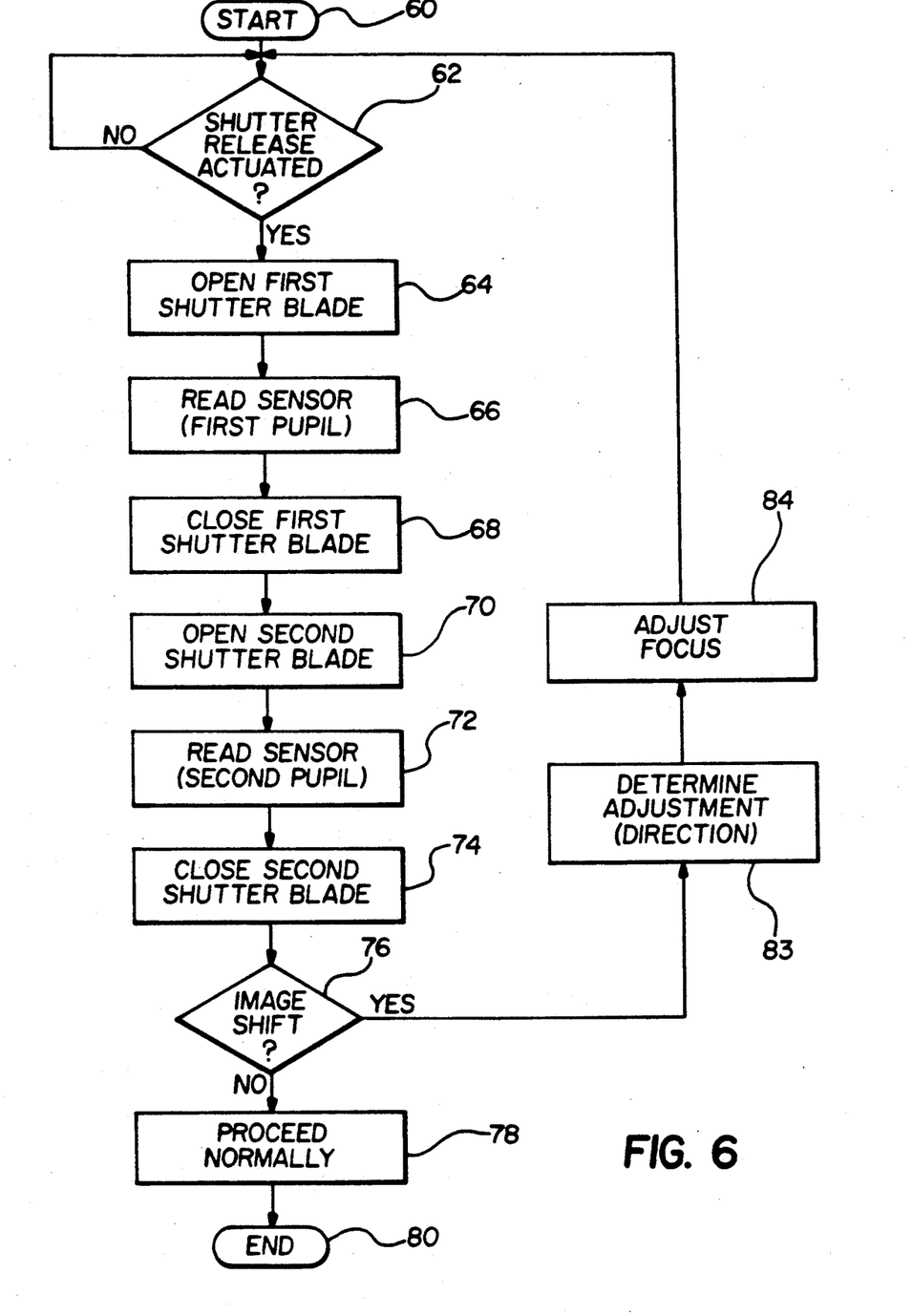
FIG. 6 is a flow chart indicating the sequence of the operation used in an alternate embodiment of the present invention.

Referring now to FIG. 6, the sequence of operation, used in the alternate embodiment of the present invention, is similar to the preferred embodiment with the following differences. Instead of determining magnitude and direction of focus error (step 82 of FIG. 5), the controller of the alternate embodiment determines a direction only (step 83 of FIG. 6). Specifically, controller 50 looks for a shift in some feature in the first pupil image with respect to the second pupil image. Controller 50 determines a focus adjustment direction (step 83) by detecting which direction the pupil images shifted (discussed previously). The camera lens is then adjusted in step 84 in the direction determined in step 83. The oscillating pupil focusing process continues at step 62 and repeats itself until the lens is in focus (i.e., no more image shift) or the shutter release is disengaged.

Accordingly, it has been shown that, by utilizing a shutter mechanism in conjunction with a controller as described herein, an oscillating pupil autofocus camera can be provided which requires minimal additional focusing components. This is because no special oscillating pupil mask is required. The use of the camera shutter mechanism and the non-use of a special mask, further maintains the compactness of the camera. In addition, the added complexity of the overall camera design is minimal.

While the invention has been described with reference to the preferred and alternate embodiments, it will be appreciated that variations and modifications can be effected within the scope of the invention. For example, shutter mechanisms comprising multiple shutter blades could be used, wherein two groups of multiple shutter blades provide first and second pupils. Alternatively, multiple blades could provide multiple pupils (e.g., horizontal and vertical), and thus multiple pupil images for oscillating pupil focus detection. Furthermore, the camera could include a three position shutter release, in which, the camera operates to perform an oscillating pupil focusing operation repeatedly while the shutter release is actuated to a first position and then proceeds normally in response to the further actuation of the shutter release to a second position.

What is claimed is:

1. A camera having a sensor array, a lens, and first and second shutter blades that can be opened to expose photographic film in the camera, the camera further comprising:
    (a) first oscillating means for opening and closing said first shutter blade to define a first pupil that permits image light to strike the sensor array;
    (b) second oscillating means for opening and closing said second shutter blade to define a second pupil that permits image light to strike the sensor array;
    (c) control means, responsive to said first and second oscillating means, for controlling said sensor array to sample the image light received through the first and second pupils, respectively;
    (d) signal means for comparing the sensed light from the first and second pupils with each other and producing a focus adjustment signal representative of a direction of focus error; and
    (e) focus means, responsive to said focus adjustment signal, for focusing said lens according to the focus error.

2. The camera according to claim 1, wherein said adjustment signal is representative of a magnitude and a direction of focus error.

3. The camera according to claim 1 wherein the first and second pupils comprise substantially equal and symmetrically opposite pupils.

4. A camera having a sensor array, a lens, and a plurality of shutter blades that can be opened to expose photographic film in the camera, the camera further comprising:
    (a) means for oscillating at least two shutter blades, separately, between open and closed positions to define corresponding pupils and to expose said sensor array with image light passing through the corresponding pupils;

(b) sensing means, responsive to said oscillating means, for controlling said sensor array to sample image light received through the corresponding pupils;

(c) signal means for comparing the sensed image light of at least two pupils with each other and poducing a focus adjustment signal representative of a direction of focus error; and (d) focus means, responsive to said focus adjustment signal, for focusing said lens according tot he focus error.

5. The camera according to claim 4 wherein said adjustment signal is representative of a magnitude and a direction of focus error.

6. The camera according to claim 4 wherein the pupils comprise substantially equal and symmetrically opposite pupils.

7. A camera having a sensor array, a lens, and a plurality of shutter blades that can be opened to expose photographic film in the camera, the camera further comprising:

(a) first oscillating means for opening and closing said plurality of shutter blades, to define a first pupil that permits image light to strike the sensor away;

(b) second oscillating means for opening and closing said plurality of shutter blades, to define a second pupil that permits image light to strike the sensor array;

(c) control means, responsive to said first and second oscillating means, for controlling said sensor array to sample the image light received through the first and second pupils, respectively;

(d) signal means for comparing the sensed light from the first and second pupils with each other and producing a focus adjustment signal representative of a direction of focus error; and (e) focus means, reponssive to said focus adjustment signal, for focusing said lens according to the focus error.

8. The camera according to claim 7, wherein said adjustment signal is representative of a magnitude and a direction of focus error.

9. The camera according to claim 7, wherein said first and second pupils comprise substantially equal and symmetrically opposite pupils.

10. A method of operating a camera having a sensor array, a lens, and at least two shutter blades that can be opened to expose photographic film in the camera, in order to properly focus the lens in preparation for exposing a frame of the photographic film, comprising the steps of:

(a) oscillating at least two of the shutter blades, separately, between open and closed positions to define corresponding pupils that permit image light to pass through and expose said sensor array;

sensing the locations of corresponding pupil images on said sensor array;

comparing the sensed locations of the pupil images with each other and producing a focus adjustment signal representative of a direction of focus error; and moving the lens in response to said focus adjustment signal for focusing the lens according to the focus error.

11. The method according to claim 10, wherein said focus adjustment signal is representative of a magnitude and direction of focus error.

12. The method according to claim 10, further comprising the step of (e) repeating steps (a) thru (d) until the focus error is nulled.

13. The method according to claim 10, wherein the entire array is used to sense the locations of the images.

14. The method according to claim 10, wherein only a part of said array is used to sense the locations of the images.

15. The method according to claim 10, wherein the pupils comprise substantially equal and symmetrically opposite pupils.

16. A method of operating a camera having a sensor array, a lens, and a plurality of shutter blades that can be opened to expose photographic film in the camera, in order to properly focus the lens, comprising the steps of:

(a) opening said plurality of shutter blades to define a first pupil that permits image light to pass through and expose said sensor array;

(b) sensing the location of a first image on said sensor array;

(c) closing said first pupil;

(d) opening said plurality of shutter blades to define a second pupil that permits image light to pass through and expose said sensor array;

sensing the location of a second image on said sensor array;

(f) closing said second pupil;

(g) comparing the sensed locations of the first and second images and producing a focus adjustment signal representative of a direction of focus error; and (h) moving the lens in response to said adjustment signal for focusing the lens according to the focus error.

17. The method according to claim 16, wherein said focus adjustment signal is representative of a magnitude and a direction of focus error.

18. The method according to claim 16, further comprising the step of (i) repeating steps (a) thru (h) until the focus error is nulled.

19. The method according to claim 16, wherein the entire array is used to sense the locations of the first and second images.

20. The method according to claim 16, wherein only a part of said array is used to sense the locations of the first and second images.

21. The method according to claim 16, wherein the first and second pupils comprise substantially equal and symmetrically opposite pupils.

22. A method of operating a camera having a sensor array, a lens, and first and second shutter blades that can be opened to expose photographic film in the camera, in order to properly focus the lens, comprising the steps of:

(a) opening said first shutter blade to define a first pupil that permits image light to strike the sensor array;

(b) sensing the location of a first image on said sensor array;

(c) closing said first pupil;

(d) opening said second shutter blade to define a second pupil that permits image light to strike the sensor array;

(e) sensing the location of a second image on said sensor array;
(f) closing said second pupil;
(g) comparing the sensed locations of the first and second images and producing a focus adjustment signal representative of a direction of focus error; and
(h) moving the lens in response to said focus adjustment signal for focusing the lens according to the focus error.

23. The method according to claim 22 wherein said adjustment signal is representative of a magnitude and a direction of focus error.

24. The method according to claim 22 further comprising the step of (i) repeating steps (a) thru (h) until the focus error is nulled.

25. The method according to claim 22 wherein the entire array is used to sense the locations of the first and second images.

26. The method according to claim 22, wherein only a part of said array is used to sense the locations of the first and second images.

27. The method according to claim 22, wherein the first and second pupils comprise substantially equal and symmetrically opposite pupils.

* * * * *